Patented Nov. 7, 1933

1,934,573

UNITED STATES PATENT OFFICE 1,934,573

PROCESS FOR THE PREPARATION OF AMMONIUM SULPHATE

Adrianus Johannes van Peski, Amsterdam, Netherlands, assignor to Naamlooze Vennootschap de Bataafsche Petroleum Maatschappij, The Hague, Netherlands No Drawing. Application February 10, 1930, Serial No. 427,432, and in Germany February 16, 1929

8 Claims. (Cl. 23—119)

It is known to prepare ammonium sulphate by oxidation of ammonium sulphite either in an aqueous solution or as a solid. If the sulphite is applied as a solid, it is treated in a finely divided condition with a current of air. The ammonium sulphite, which can be previously prepared from sulphurous acid and ammonia, is therefore, in so far as the manufacture of sulphate is concerned, an intermediate product, of which the separation, working up, etc. involves considerable expense and labour.

My invention relates to a process which renders it possible to continuously prepare ammonium sulphate from gaseous sulphur dioxide and ammonia. It is true that also an intermediate product is formed, which has to be further converted into ammonium sulphate by oxidation and addition of water, but this intermediate product is ready for further treatment directly after its formation and does not require any special working up.

The process according to my invention substantially consists in ammonia and sulphur dioxide being made to interact and the intermediate product formed being converted into ammonium sulphate by means of water or steam and oxygen, air or other oxidizing gases.

The process of the reaction may be conceived as follows:

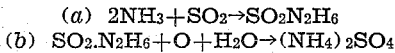

(a) $2NH_3 + SO_2 \rightarrow SO_2N_2H_6$
(b) $SO_2.N_2H_6 + O + H_2O \rightarrow (NH_4)_2SO_4$ The reaction according to Equation (a) takes place in the absence of water; it is evident, however, that in case the gases contain traces of moisture, there is no need to eliminate these.

The reaction can be carried out in various manners. The necessary water or steam may be caused to act upon the intermediate product for instance in combination with the oxidizing gas. The manufacture of the intermediate product from $SO_2$ and $NH_3$ in the substantial absence of water can be achieved at a suitable, either ordinary or raised, temperature, for example 115° C. The oxidation and addition of water are favourably influenced by the use of elevated temperatures, whereby it has appeared to be advantageous to heat the reaction mixture up to temperatures ranging between 100° and 120° C. In this manner the process can be easily carried out continuously.

Furthermore the reaction may be performed at ordinary, and also at higher or lower pressures. The oxidation may contingently be promoted by any means of transmitting oxygen known in itself.

The following may serve as an example of carrying out the new process. $SO_2$ and $NH_3$ in the substantial absence of water are introduced from above into a vertical tube provided with a suitable stirrer. This tube is internally heated in a suitable manner, say to 115° C., the stirrer being at the same time heated high enough to enable a material sublimation of the intermediate product precipitated thereon. The walls of the tube, however, are cooled so as to cause practically the whole mass of the intermediate product formed to precipitate on the surface. The stirrer and possible further suitable means scratch off the substance thus precipitated on the walls, whereupon the intermediate product falling down gets into a humid current of air, which contributes to the oxidation to sulphate.

At temperatures above 120° C. a considerable sublimation of the intermediate product occurs, which in general should be avoided with a view to the further conversion into sulphate. Needless to say that the process according to my invention may be carried out in different manners and that various applications of the process are possible within the scope of the invention.

The process according to my invention offers a considerable advantage over the process for manufacturing ammonium sulphate by means of oxidation of solid ammonium sulphite. Although in general the oxidation of solid ammonium sulphite can be more easily carried out than the oxidation of an aqueous solution of ammonium sulphite, the former reaction very much depends on the water content of the solid, requiring a most intensive drying of the latter. Now according to my invention the complete drying of a solid substance, which always gives rise to certain technical difficulties, is avoided. The intermediate product according to the invention is very easily manufactured in a dry state when starting from dry $SO_2$ and $NH_3$. Besides the subsequent states of oxidation and addition of water can be easily carried out in such a manner as to leave the substance dry throughout the process, viz. by adding rather less water or steam than theoretically necessary for the conversion into ammonium sulphate.

What I claim is:

1. The process of manufacturing ammonium sulphate, which comprises reacting ammonia and sulphur dioxide in the substantial absence of water, and contacting the reaction product with water and oxygen thereby forming ammonium sulphate.

2. The process of manufacturing ammonium sulphate, which comprises reacting ammonia and sulphur dioxide in the substantial absence of water, and contacting the reaction product with an oxidizing gas charged with steam into ammonium sulphate.

3. The process of manufacturing ammonium sulphate, which comprises reacting ammonia and sulphur dioxide in the substantial absence of water, and contacting the reaction produce with moist air thereby forming ammonium sulphate.

4. The process of manufacturing ammonium sulphate, which comprises reacting ammonia and sulphur dioxide in the substantial absence of water, and contacting the reaction product with water and oxygen thereby forming ammonium sulphate, the said reaction product entering the oxidizing stage immediately after its formation.

5. The process of manufacturing ammonium sulphate, which comprises reacting ammonia and sulphur dioxide in the substantial absence of water, and contacting the reaction product with an oxidizing gas charged with steam thereby forming ammonium sulphate, the said reaction product entering the oxidizing stage immediately after its formation.

6. The process of manufacturing ammonium sulphate, which comprises reacting ammonia and sulphur dioxide in the substantial absence of water, and contacting the reaction product with moist air thereby forming ammonium sulphate, the said reaction product entering the oxidizing stage immediately after its formation.

7. The process of manufacturing ammonium sulphate, which comprises reacting ammonia and sulphur dioxide in the substantial absence of water, and contacting the reaction product with water and oxygen thereby forming ammonium sulphate, the said reaction product entering the oxidizing stage immediately after its formation, the reactions being carried out at a temperature between 100 and 120° C.

8. The process of continuously manufacturing ammonium sulphate, which comprises continuously conducting a mixture of ammonia and sulphur dioxide through a reaction chamber heated to a temperature between 100 and 120° C., contacting the solid intermediate reaction product thereby formed with a current of moist oxidizing gas, and gradually withdrawing the ammonium sulphate thus formed.

ADRIANUS JOHANNES van PESKI.